Figure 1:
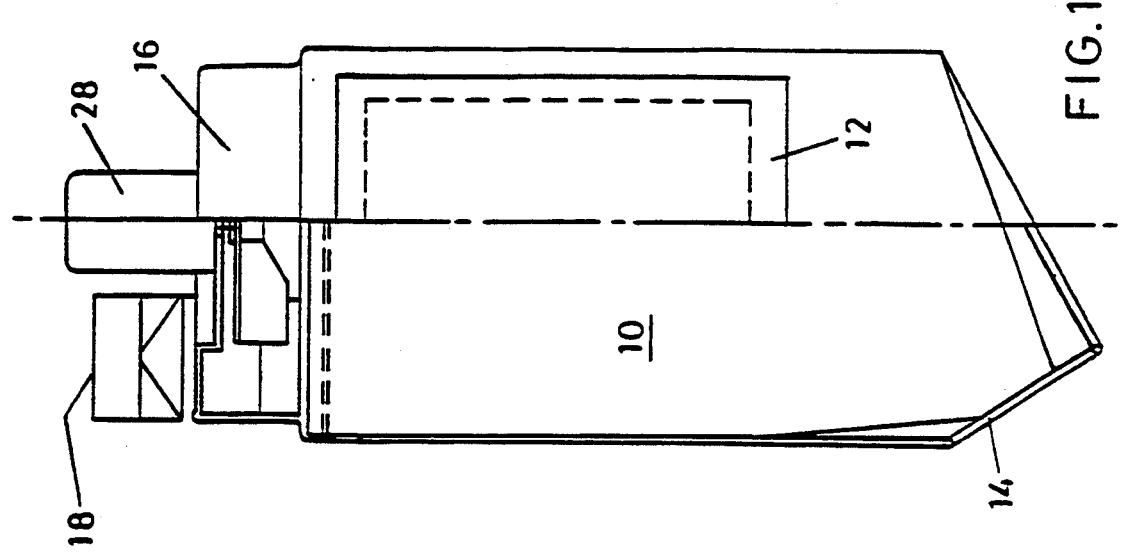

United States Patent [19]
Thorne

[11] Patent Number: 5,381,759
[45] Date of Patent: Jan. 17, 1995

[54] FEEDING DEVICES FOR STOCK

[76] Inventor: John Thorne, Beacon Cottage Farm, Deans Lane, Woodhouse Eaves, Loughborough, Leicestershire, LE12 8TE, United Kingdom

[21] Appl. No.: 94,005
[22] PCT Filed: Dec. 31, 1991
[86] PCT No.: PCT/GB91/02330
§ 371 Date: Jul. 26, 1993
§ 102(e) Date: Jul. 26, 1993
[87] PCT Pub. No.: WO92/12626
PCT Pub. Date: Aug. 6, 1992

[30] Foreign Application Priority Data

Jan. 24, 1991 [GB] United Kingdom ............... 9101521

[51] Int. Cl.6 .................................................. A01K 1/10
[52] U.S. Cl. ....................................... 119/60; 119/58
[58] Field of Search ................ 119/52.1, 58, 59, 60

[56] References Cited

U.S. PATENT DOCUMENTS

| 54,138 | 4/1866 | Foreacre | 119/58 |
|---|---|---|---|
| 343,491 | 6/1886 | Queen | 119/58 |
| 807,197 | 12/1905 | O'Brien | 119/58 |
| 3,885,524 | 5/1975 | Gregory | 119/58 X |
| 4,798,171 | 1/1989 | Peters et al. | 119/15 |

FOREIGN PATENT DOCUMENTS

| 0404028 | 12/1990 | European Pat. Off. . | |
| 8807919.8 | 9/1988 | Germany . | |
| 1522582 | 8/1978 | United Kingdom . | |
| 1308283 | 5/1987 | U.S.S.R. | 119/58 |

Primary Examiner—Robert P. Swiatek
Attorney, Agent, or Firm—Marshall, O'Toole, Gerstein, Murray & Borun

[57] ABSTRACT

A feeding device for stock comprises a bin (10) having a lid or door (12), a slot (14) for the withdrawal of forage as it is consumed, a fan (16) for drawing air in through the slot (14) and out of the bin (10), and a duct (18) for discharging the air at a remote location.

8 Claims, 2 Drawing Sheets

FEEDING DEVICES FOR STOCK

TECHNICAL FIELD

The invention relates to feeding devices from which horses, cattle or the like can withdraw hay or like forage for eating.

BACKGROUND ART

Much hay, straw and forage contains dust of vegetable, mineral and most significantly biological particles, such as moulds and bacteria (pathogens). A proportion of these particles becomes airborne when the forage is disturbed, including when it is eaten, for example when a horse pulls a mouthful of hay from a rack.

Many horses and ponies become allergic to these dusts, which cause respiratory problems affecting their performance and frequently preventing them from work. Permanent lung damage may be caused, and the value of the animal may be reduced. Grooms and other attendants can be similarly affected with a complaint known as farmer's lung.

THE INVENTION

The invention provides a feeding device for stock comprising a bin having a lid or door, a slot for the withdrawal of forage as it is consumed, a fan for drawing air in through the slot and out of the bin, and a duct for discharging the air at a remote location. In use, the duct would generally be arranged to discharge the air outside the stable environment. The lid or door is preferably arranged so that it cannot be left in an open position, but closes automatically. This ensures that the fan draws air through any forage in the bin, and so tends to draw away the dust from the animals and their attendants.

The fan is preferably of the non-clogging or paddle-wheel type, and may be provided with a mesh guard to prevent forage entering. The slot may be provided with bars to prevent excessive quantities of forage being pulled out at one time. A filter may be installed upstream or downstream of the fan to collect dust and prevent its recirculation in the atmosphere of the stable. A single fan may be applied to more than one bin. The device may include a trough for concentrates or short feeds arranged so that the fan withdraws dust from them also.

An experiment with an impact-type dust sampler has shown that a device according to the invention has reduced the number of spores per milliliter of dusty air from $10^5$ to $10^2$. The bin, which is generally of metal or plastics material, forms an enclosure for the forage so that air can be drawn through.

DRAWINGS

Figure 2:
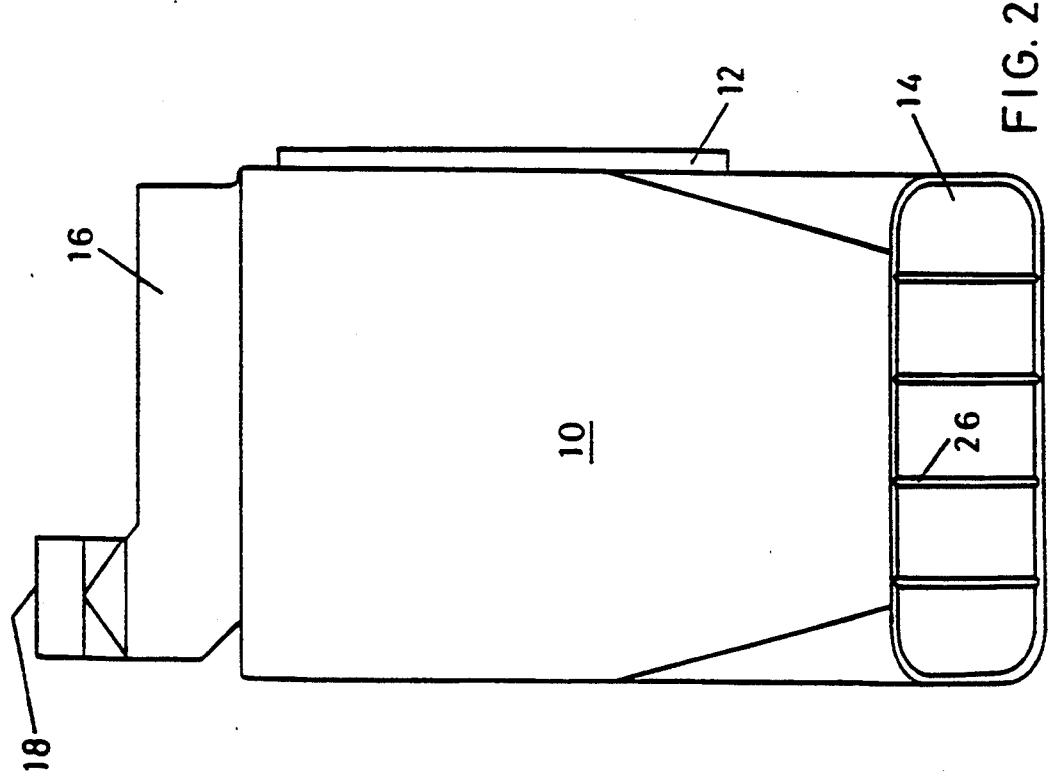
Figure 3:
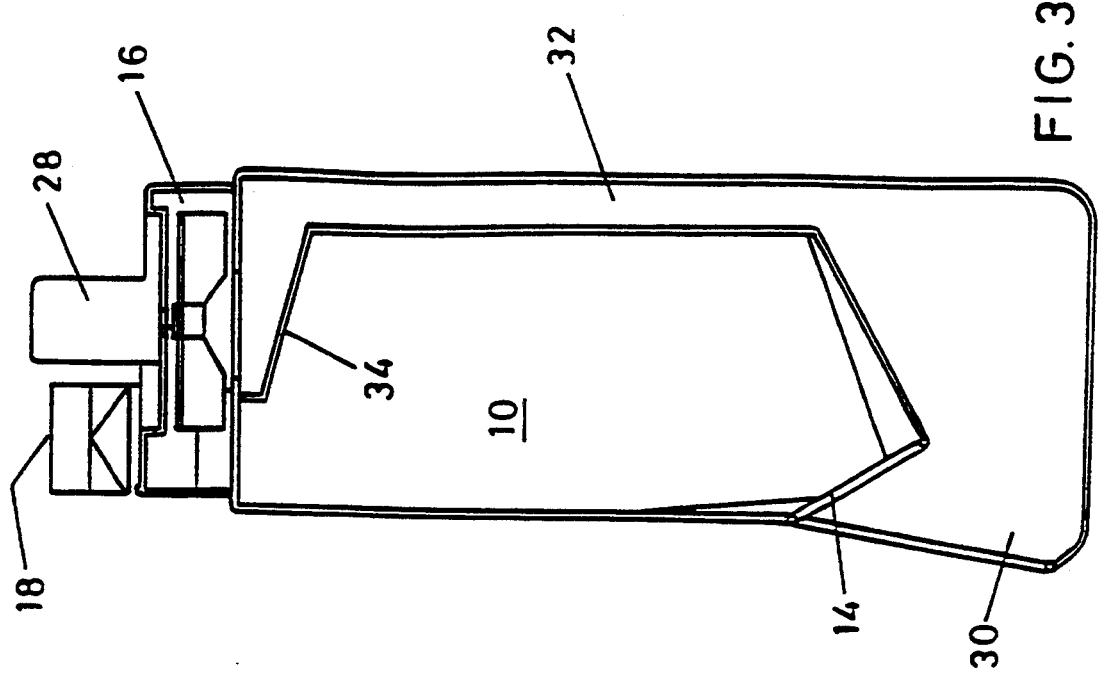
Figure 4:
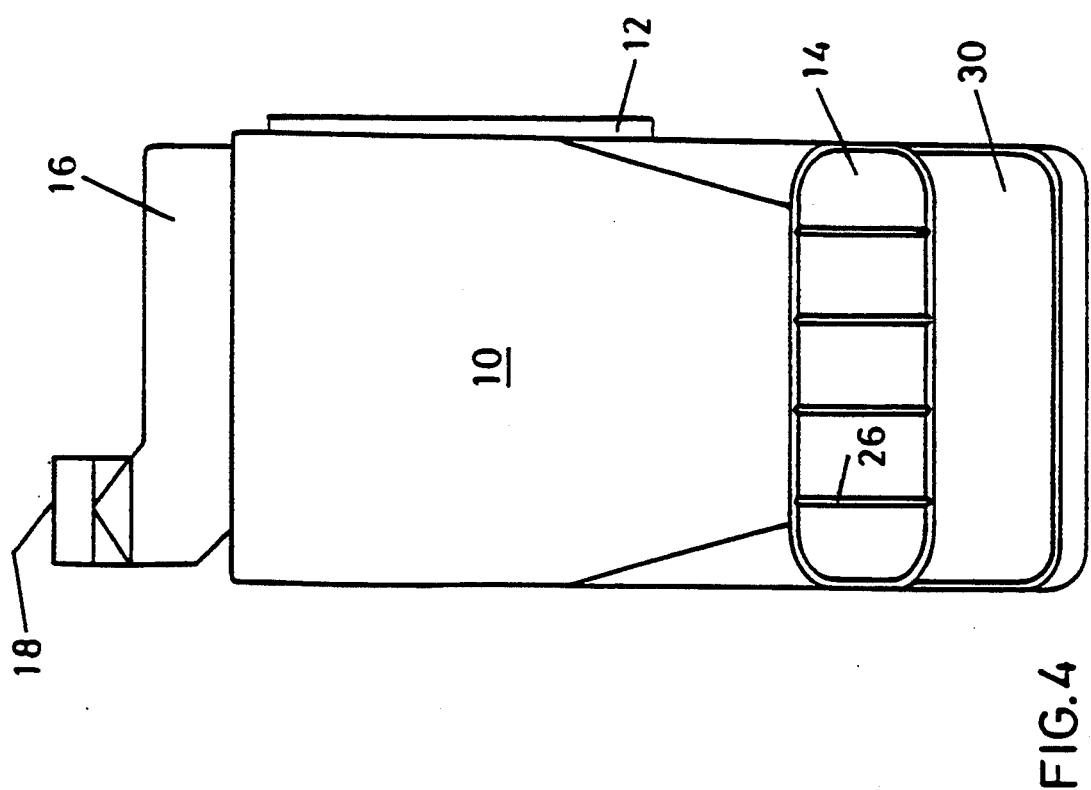

FIGS. 1 and 2 are respectively a side part-sectional and a front elevation of a first feeding device according to the invention; and FIGS. 3 and 4 are similar views of a second such device.

BEST MODE

With reference to FIGS. 1 and 2, a bin 10 has a door and a slot 14 for the withdrawal of forage as it is consumed. The bin 10 is of rotation moulded plastics material, while the slot 14 is fitted with a metal feed bar unit screwed through tags (not shown) to the plastics material. The bin 10 is provided with bars (not shown) on the back whereby the bin 10 may be secured to a wall.

A fan 16 draws air in through the slot 14 and out of the bin 10. A duct from 18 leads away from the fan 16 through a length of pliable aluminum hose (not shown) secured by a worm-drive clip, and discharges the air at a remote location outside the stable. The door 12 is hinged and spring-loaded so that it tends towards a closed position. The feed bar unit in slot 14 is equipped with upright bars 26 to prevent excessive quantities of hay being pulled out. The fan 16 is mounted in a moulded involute case, and provided with a mesh inlet guard (not shown) for keeping operators hands and forage away from the fan 16. The fan 16 is driven by an electric motor 28 provided with a residual current safety device.

With reference to FIGS. 3 and 4, the second device corresponds to the first and has been marked as far as possible with the same reference numerals to indicate the same functional parts. The modification is that the device includes a trough 30 for concentrates below the slot 14, and a duct 32 behind the bin 10 arranged so that the fan 16 withdraws dust from the concentrates as well as the forage. At the top, the bin 10 has an aperture 34 so that the fan 16 draws approximately equally from the bin 10 and duct 32.

I claim:

1. A feeding device for stock comprising a bin (10) having a door (12), a slot (14) for the withdrawal of forage as it is consumed, a fan (16) for drawing air in through the slot (14) and out of the bin (10), and a duct (18) for discharging the air at a remote location.

2. A feeding device according to claim 1 in which the a door (12) is arranged so that it cannot be left in an open position.

3. A feeding device according to claim 1 in which the fan (16) is provided with a mesh guard to prevent forage entering.

4. A feeding device according to claim 1 in which a filter is installed upstream of the fan to collect dust.

5. A feeding device according to claim 1 in which a single fan (16) is applied to more than one bin (10).

6. A feeding device according to claim 1 which includes a trough (30) for concentrates arranged so that the fan (16) withdraws dust from the concentrates also.

7. A feeding device according to claim 1 comprising a dust collecting filter disposed downstream of the fan.

8. A feeding device for stock comprising a bin (10) having a lid (12), a slot (14) for the withdrawal of forage as it is consumed, a fan (16) for drawing air in through the slot (14) and out of the bin (10), and a duct (18) for discharging the air at a remote location.

* * * * *